(12) United States Patent
Lin

(10) Patent No.: US 6,577,477 B1
(45) Date of Patent: Jun. 10, 2003

(54) HARD MAGNETIC BIAS CONFIGURATION FOR GMR

(75) Inventor: Chien-Li Lin, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 243 days.

(21) Appl. No.: 09/774,415

(22) Filed: Feb. 1, 2001

(51) Int. Cl.$^7$ ................................................. G11B 5/39
(52) U.S. Cl. ................................................. 360/324.12
(58) Field of Search .................... 360/324.12, 324, 360/327.1, 327.3, 324.1, 324.11; 324/252, 207.21; 338/32 R

(56) References Cited

U.S. PATENT DOCUMENTS

| | | | |
|---|---|---|---|
| 5,018,037 A | 5/1991 | Krounbi et al. | 360/113 |
| 5,079,035 A | 1/1992 | Krounbi et al. | 427/130 |
| 5,739,987 A | 4/1998 | Yuan et al. | 360/113 |
| 5,739,990 A | 4/1998 | Ravipati et al. | 360/113 |
| 5,849,422 A | 12/1998 | Hayashi | 428/611 |
| 5,919,580 A | 7/1999 | Barnard et al. | 428/692 |
| 5,919,581 A | 7/1999 | Yamamoto et al. | 428/694 T |
| 5,995,338 A * | 11/1999 | Watanabe et al. | 360/324.12 |
| 6,020,060 A | 2/2000 | Yoshida et al. | 428/332 |
| 6,117,570 A | 9/2000 | Chen et al. | 428/694 T |
| 6,266,210 B1 * | 7/2001 | Shiroishi | 360/126 |

* cited by examiner

Primary Examiner—George J. Letscher
(74) Attorney, Agent, or Firm—George O. Saile; Stephen B. Ackerman

(57) ABSTRACT

A longitudinal bias structure for use in a GMR device is described. Improved magnetic properties of the bias structure are achieved by inserting an extra layer between the seed layer and the bias layer. This layer has lattice constants that are intermediate between those of the seed and bias layers thereby improving the crystallinity of the latter. Specifically, a layer of chromium-cobalt-tantalum is inserted between a seed layer of chromium, or chromium-titanium, and a hard magnetic (bias) layer of cobalt-chromium-platinum or cobalt-platinum. About 20 Angstroms is optimum for the thickness of this layer. Data is presented showing that significant improvements in coercivity and hysteresis loop squareness are obtained.

17 Claims, 1 Drawing Sheet

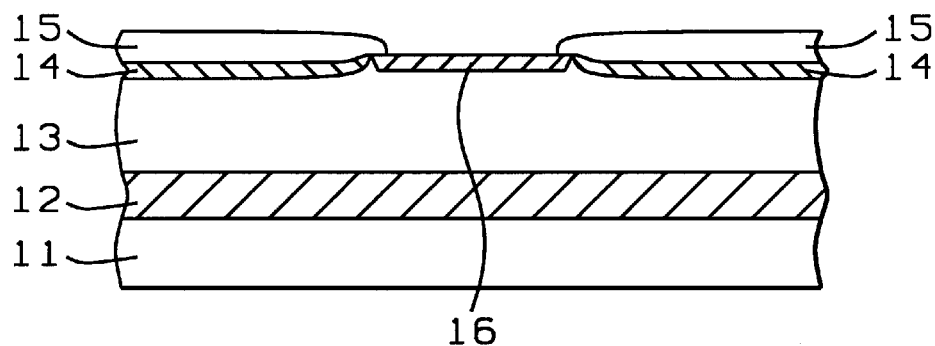
*FIG. 1 - Prior Art*
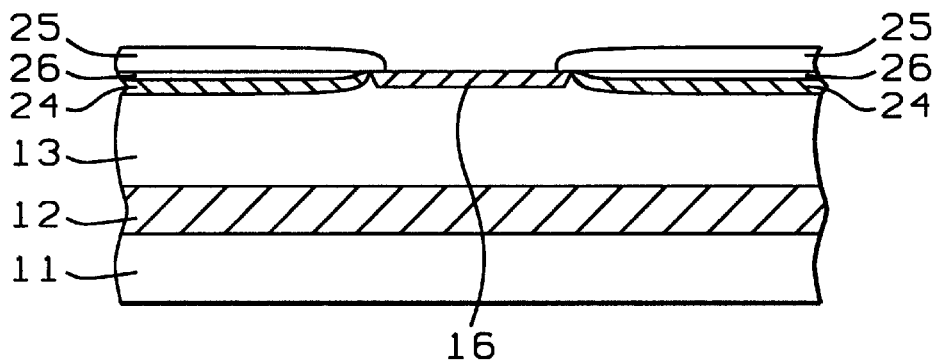
*FIG. 2*
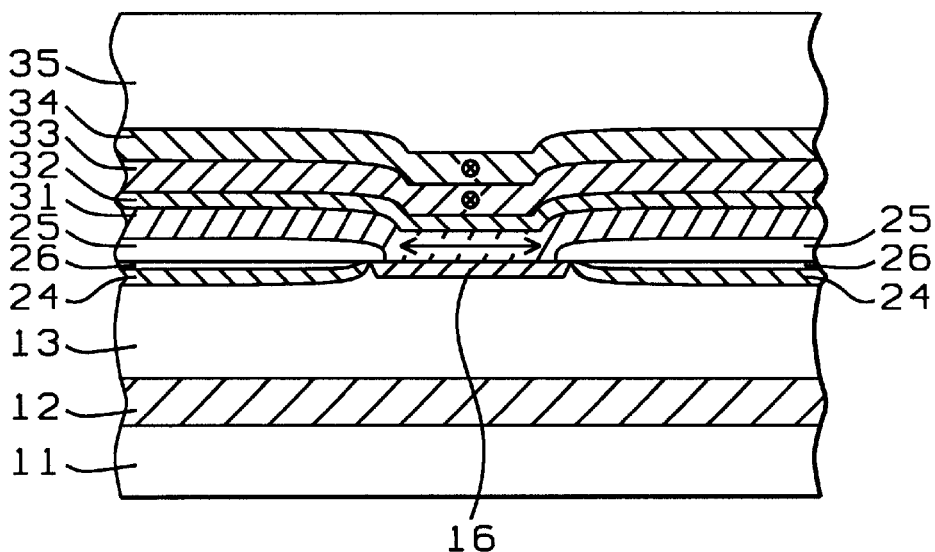
*FIG. 3*

HARD MAGNETIC BIAS CONFIGURATION FOR GMR

FIELD OF THE INVENTION

The invention relates to the general field of GMR based magnetic read heads with particular reference to the structure and formation of longitudinal biasing facilities.

BACKGROUND OF THE INVENTION

As areal recording densities reach several Gbits/in$^2$, development of next generation giant magnetoresistive (GMR) hard disk drive head is under way. In the GMR head design, a GMR read head sensor consists of a sandwich structure: "sensing free layer", "conducting space layer", and "pinned layer". The magnetization of the free layer is free to respond to external magnetic field from the media. The magnetization of the pinned layer is pinned at about 90° to the magnetization of the free layer. As the conduction electrons are scattered between the free and pinned layers through the spacer, the electrical resistance of the head changes in response to the angle of the directions of magnetization between the free and pinned layers.

In order to obtain a noise-free reproducing waveform, a hard magnetic bias structure is required to suppress the domain walls movement of the free layer. This is accomplished by depositing hard magnetic thin films in an abutting relationship with the free layer on both sides (as seen in plan view). The hard magnetic thin films supply longitudinal magnetic flux to saturate the free layer along its easy axis to a single domain state. The required magnetic flux is approximately the product of remnant magnetization of the free layer and the area of abutting junction. The appearance of the longitudinal bias layer is schematically illustrated in FIG. 1. Seen there is substrate 11 which has been coated with a magnetic shield layer 12 which, in turn, has been coated with dielectric layer 11. Layer 14, which is a cross-sectional view of two parallel stripes (plan view not shown), is a seed layer for the longitudinal bias structure 15. Layer 16 is a separate seed layer (which may or may not be the same as layer 14) upon which the free layer of the GMR structure will later be grown.

Currently, a hard bias layer consists of a 100 Å Cr underlayer and a $CoCr_{5.2}Pt_{16.2}$ magnetic layer. The thickness of the $CoCr_{5.2}Pt_{16.2}$ layer depends on the magnetic flux required to saturate the GMR free layer. This thickness ranges from 350 to 450 Å. Since the GMR head stack is composed of NiFe, CoFe, Cu[FCC (111)], and MnPt[FCT (111)] layers, a portion of the hard magnetic films formed on the tapered abutting junction on such a crystal structure tends to have its properties greatly deteriorated, particularly its coercive force. In a recent design, a 50 Å thick Ta seed layer was applied between the Cr underlayer and the abutting junction of the GMR stack. This tantalum layer facilitated growth of Cr BCC (110) over the abutting junction of the GMR stack.

For hard magnetic thin films to be used in a GMR head, three fundamental magnetic properties are required in order to prevent Barkhausen noise (due to domain movement, as mentioned above). First, to ensure that a stable reproducing characteristic is maintained even when an external magnetic field is applied, the hard magnetic thin film must have large coercive force. Second, the in-plane remnant magnetization ($M_r$) or $M_r$ times thickness $M_rt$) should be large enough, since this is the component of the hard magnetic thin film that provides the longitudinal bias flux.

If the $M_r$ of the hard magnetic bias layer is less than the $M_r$ of the free layer, with the shared abutting junction, longitudinal bias for the free layer is bound to fall short of supplying the necessary flux. This implies that the saturation magnetization ($M_s$) and squareness ($M_r/M_s$) of the hysteresis loop of the hard bias layer along the in-plane direction should be high. Furthermore, the hard bias layer should have high thermal stability to prevent long magnetization decay by thermal activation. With the GMR head shield-to-shield spacing getting closer, we also need to reduce the thickness required in the hard magnetic films by using material with high $M_s$.

A routine search of the prior art was performed with the following references of interest being found:

The use of longitudinal bias in GMR structures has been disclosed in U.S. Pat. Nos. 5,018,037 and 5,079,035. In U.S. Pat. No. 6,117,570, Chen et al. discuss using CoCrTa layers as a means for increasing the coercivity of CoCrPtTa thin films for use in recording data. They used nickel-aluminum for their seed layer. U.S. Pat. No. 6,020,060 (Yoshida et al.) shows a CoCrTaPt layer while U.S. Pat. No. 5,739,990 (Ravipati et al.), U.S. Pat. No. 5,739,987 (Yuan et al.), U.S. Pat. No. 5,849,422 (Hayashi), U.S. Pat. No. 5,919,581 (Yamamoto et al.), and U.S. Pat. No. 5,919,580 (Barnard et al.) all show related patents.

SUMMARY OF THE INVENTION

It has been an object of the present invention to provide a hard bias layer with high Ms, squareness (S), high coercivity ($H_c$), and thermal stability through microstructural engineering.

Another object has been to provide a process for manufacturing said bias layer.

These objects have been achieved by inserting an extra layer between the seed layer and the bias layer. This layer has lattice constants that are intermediate between those of the seed and bias layers thereby improving the crystallinity of the latter. Specifically, a layer of chromium-cobalt-tantalum is inserted between a seed layer of chromium, or chromium-titanium, and a hard magnetic (bias) layer of cobalt-chromium-platinum or cobalt-platinum. About 20 Angstroms is optimum for the thickness of this layer. Data is presented showing that significant improvements in coercivity and hysteresis loop squareness are obtained.

BRIEF DESCRIPTION OF THE DRAWINGS

FIG. 1 is a cross-sectional view of a structure that provides longitudinal bias according to the teachings of the prior art.

FIG. 2 is a cross-sectional view of a structure that provides longitudinal bias according to the teachings of the present invention.

FIG. 3 is the structure of FIG. 2 with additional layers added to form the GMR device.

DESCRIPTION OF THE PREFERRED EMBODIMENTS

The microstructural parameters (i.e. crystallographic preferred orientation and grain size) of a hard bias magnetic layer play key roles in controlling its magnetic characteristics. The Chromium underlayer is mainly used to control these microstructural parameters. For example, orientation and grain size of the cobalt-based magnetic alloy. When the BCC Cr underlayer is deposited at room temperature on Alumina or Tantalum substrates, a (110) preferred orientation is usually formed. This orientation is the lowest energy surface and thus can reduce the surface energy. This preferred orientation promotes the epitaxial growth of the HCP Co (101) alloy, thereby improving the in-plane magnetic orientation.

Cr (110) and Co (101) are a perfect match with respect to lattice spacing at the interface for epitaxy. However, as Pt is added to increase the magneto-crystalline anisotropy of the Co alloy, the lattice spacing is expanded. For example, the length of the c-axis of pure Co is 4.07 Å while the length of the c-axis of $CoCr_{51}N_{62.2}$ is 4.17 Å as measured by X-ray diffraction. This 2.46% increase in the c lattice spacing will cause a mismatch at the Cr (110) and $CoCr_{51}N_{16.2}$ (101) interface. Because of this mismatch, some $CoCr_{51}N_{16.2}$ grains will grow with a (002) low energy, surface resulting in a perpendicular orientation of the c-axis. This perpendicular c-axis orientation will reduce the in-plane coercivity and S.

The present invention teaches how an improved lattice match between Cr (110) and Co (101) may be achieved, thereby enhancing epitaxy. This has been accomplished by introducing a buffer layer between the seed layer and the hard magnetic layer. The buffer layer having lattice constants that are intermediate between those of the seed and hard magnetic layers.

As is well known to those skilled in the art, small changes in composition, thickness, and separation, can have a drastic effect on the magnetic characteristics of multi-film laminates. Accordingly, it will be understood that the narrow ranges of film compositions and thicknesses that are disclosed in the six embodiments presented below are critical and any departure from these specifications will result in devices of inferior quality relative to those whose behavior we report at the end of this section.

We also note here that, since the devices that we describe below are simple multi-layer structures, the processes for their preparation will be apparent to those skilled in the art once the structure has been disclosed.

First Embodiment

Referring now to FIG. 2, we show there a structure that is similar to prior art FIG. 1. Layers 24 and 25 represent the seed layer and the hard magnetic layer respectively and correspond to layers 14 and 15 respectively in FIG. 1. Since they are not necessarily the same as these two layers they have been assigned different numbers.

Comparison of FIGS. 1 and 2 reveals that the critical difference between them is the presence of buffer layer 26 between the seed 24 and hard magnetic layer 25. In this first embodiment the seed layer is chromium. It is between about 20 and 150 Angstroms thick with 100 Angstroms being preferred.

Shown on chromium layer 24 is buffer layer 26. It is an alloy whose composition is between about 70 and 93 atomic percent cobalt, between about 5 and 25 atomic percent chromium, and between about 2 and 10 atomic percent tantalum, with cobalt 82%, chromium 14%, and tantalum 4% being preferred. Its thickness is between about 10 and 100 Angstroms, with 20 Angstroms being preferred.

On buffer layer 26, is magnetically hard layer 25. It is an alloy whose composition is between about 50 and 93 atomic percent cobalt, between about 5 and 25 atomic percent chromium, and between about 2 and 50 atomic percent platinum, with cobalt 78.6%, chromium 5.2%, and platinum 16.2% being preferred. Its thickness is between about 100 and 600 Angstroms, with 400 Angstroms being preferred.

Second Embodiment

This is the same as the first embodiment except that a layer of tantalum (not shown) has been inserted between substrate 13 and seed layer 24. It has a thickness between about 10 and 100 Angstroms, with 50 Angstroms being preferred.

Third Embodiment

Referring again to FIG. 2, we show a structure that is similar to that of the first embodiment except that seed layer 24 is an alloy of chromium and titanium. It is between about 20 and 150 Angstroms thick with 100 Angstroms being preferred. Its composition is between about 80 and 95 atomic percent chromium and between about 5 and 20 atomic percent titanium, with $Cr_{90}Ti_{10}$, being preferred.

Fourth Embodiment

This is the same as the third embodiment except that a layer of tantalum (not shown) has been inserted between substrate 13 and seed layer 24. It has a thickness between about 10 and 100 Angstroms, with 50 Angstroms being preferred.

Fifth Embodiment

As previously, we refer to FIG. 2. Seed layer 24 is chromium. It is between about 20 and 150 Angstroms thick, with about 100 Angstroms being preferred.

Buffer layer 26 is an alloy whose composition is between about 70 and 93 atomic percent cobalt, between about 5 and 25 atomic percent chromium, and between about 2 and 10 atomic percent tantalum of cobalt 82%, chromium 14%, and tantalum 4% being preferred. Its thickness is between about 10 and 100 Angstroms, with 20 Angstroms being preferred.

On buffer layer 26, is magnetically hard layer 25. It is an alloy whose composition is between about 50 and 95 atomic percent cobalt and between about 5 and 50 atomic percent platinum with cobalt 80% and platinum 20% being preferred. Its thickness is between about 100 and 600 Angstroms, with 400 Angstroms being preferred.

Sixth Embodiment

This is the same as the fifth embodiment except that seed layer 24 is an alloy of chromium and titanium. It is between about 20 and 150 Angstroms thick with 100 Angstroms being preferred. Its composition is between about 80 and 95 atomic percent chromium and between about 5 and 20 atomic percent titanium, with $Cr_{90}Ti_{10}$, being preferred.

For each of the above embodiments, the structure is completed by the addition of the layers shown schematically in FIG. 3. Seen there are free layer 31, non-magnetic layer 32, pinned layer 33, pinning layer 34, and cap layer 35.

DISCUSSION

In the first embodiment, a thin $CoCr_{14}Ta_4$ layer (20 Å) is deposited between Cr and $CoCr_{5.2}Pt_{16.2}$ layers. The preferred configurations are $Cr/CoCr_{14}Ta_4/CoCr_{5.2}Pt_{16.2}$ and $Ta/Cr/CoCr_{14}Ta_4/CoCr_{5.2}Pt_{16.2}$. $CoCr_{14}Ta_4$ has a c-axis length of 4.15 Å in between pure Co (4.07 Å) and $CoCr_{5.2}Pt_{16.2}$ (4.17 Å), thus serves as a buffer layer for lattice match between Cr and $CoCr_{5.2}Pt_{16.2}$. Due to such a buffer layer arrangement, we can reduce the CoCrPt thickness required to keep the same Mrt as the conventional configuration of Cr/CoCrPt or Ta/Cr/CoCrPt; at the same time, the hard bias films would improve both in $H_c$ and S.

For example, the Mrt, $H_c$, and S of Cr100 Å/COCrPt 400 A is 2.95 mEMU/cm2, 1638 Oe, and 0.84, respectively. Once we put 20 A CoCrTa in between Cr and CoCrPt, the Mrt, $H_c$, and S of Cr100 Å/CoCrTa 20 Å/CoCr$_{14}$Ta$_4$ Å becomes 2.95 mEMU/cm2, 1975 Oe, and 0.88, respectively. Here we keep the same Mrt, but reduce the thickness by 9%, increase $H_c$ by 20%, and S by 5%.

In the fourth embodiment, a thin CoCr$_{14}$Ta$_4$ layer (20 Å) is deposited between CrTi and CoCr$_{5.2}$Pt$_{16.2}$ layers. The better lattice match between CrTi and CoCrTa as well as between CoCrTa and CoCrPt gives higher Mrt, $H_c$, and S. In the case of Ta 50 Å/CrTi 100 Å/CoCrPt 350 Å, the Mrt, $H_c$ and S are 2.71 mEMU/cm2, 1819 Oe, and 0.90, respectively. Once buffer layer CoCr$_{14}$Ta$_4$ layer (20 Å) is added, configuration Ta 50 Å/CrTi 100 Å/CoCr$_{14}$Ta$_4$ 20 Å/CoCrPt 350 Å can achieve the same Mrt, but $H_c$ and S become 1983 Oe and 0.91, respectively. The $H_c$ gains by 9%.

In the fifth embodiment, CoPt$_{20}$ replaces CoCr$_{5.2}$Pt$_{16.2}$ as magnetic layer combining with the buffer layer CoCrTa. CoPt$_{20}$ has higher Ms (due to lesser Cr content) and crystalline anisotropy (due to higher Pt content) than CoCr$_{5.2}$Pt$_{16.2}$. This implies that CoPt$_{20}$ has potential for higher Mrt, Hc, and S if lattice match at the interface can be achieved. For example, configuration Cr 100 Å/CoCrTa 20 Å/CoPt20% 350 Å is used as replacement of the configuration Cr 100 Å/CoCrPt 400 Å. In such case, the Mrt keeps the same, which is 2.95 mEMU/cm$^2$; but the thickness of magnetic layer is reduced by 12% from 400 Å to 350 Å. The coercivity improves by 27% from 1636 Oe to 2080 Oe while S improves from 0.84 to 0.90.

The above results, which were obtained by experiment, are summarized in TABLE I below:

TABLE I

| Structure (thicknesses in Å) | type | Mr.t | $H_c$ | S |
|---|---|---|---|---|
| Cr100/CoCrPt400 | P | 2.95 | 1638 | 0.84 |
| Cr100/CoCrTa20/CoCrPt370 | I | 2.95 | 1975 | 0.88 |
| Ta50/CrTi100/CoCrPt350 | P | 2.71 | 1819 | 0.90 |
| Ta50/CrTi100/CoCrTa20/CoCrPt350 | I | 2.71 | 1983 | 0.91 |
| Cr100/CoCrPt400 | P | 2.95 | 1636 | 0.84 |
| Cr100/CoCrTa20/CoPt350 | I | 2.95 | 2080 | 0.90 |

Mr.t in mEMU/cm$^2$
$H_c$ in oersted
P = prior art
I = invention

While the invention has been particularly shown and described with reference to the preferred embodiments thereof, it will be understood by those skilled in the art that various changes in form and details may be made without departing from the spirit and scope of the invention.

What is claimed is:

1. A longitudinal bias structure for use in a GMR based magnetic read head, comprising:
    a substrate;
    on said substrate a seed layer of chromium;
    on the chromium layer a buffer layer that is an alloy of cobalt, chromium, and tantalum, said buffer layer having a thickness between about 10 and 100 Angstroms;
    a layer of tantalum, between about 10 and 100 Angstroms thick, between the substrate and the seed layer; and
    on the buffer layer, a magnetically hard layer that is an alloy of cobalt, chromium and platinum.

2. The structure described in claim 1 wherein the buffer layer is between about 70 and 93 atomic percent cobalt, between about 5 and 25 atomic percent chromium, and between about 2 and 10 atomic percent tantalum.

3. The structure described in claim 1 wherein the chromium layer has a thickness between about 20 and 150 Angstroms.

4. The structure described in claim 1 wherein the magnetically hard layer has a thickness between about 100 and 600 Angstroms.

5. The structure described in claim 1 wherein the magnetically hard layer is between about 50 and 93 atomic percent cobalt, between about 5 and 25 atomic percent chromium, and between about 2 and 50 atomic percent platinum.

6. A longitudinal bias structure for use in a GMR based magnetic read head, comprising:
    a substrate;
    on said substrate a seed layer that is an alloy of chromium and titanium;
    on the chromium layer a buffer layer that is an alloy of cobalt, chromium, and tantalum, said buffer layer having a thickness between about 10 and 100 Angstroms;
    a layer of tantalum, between about 10 and 100 Angstroms thick, between the substrate and the seed layer; and
    on the buffer layer, a magnetically hard layer that is an alloy of cobalt, chromium and platinum.

7. The structure described in claim 6 wherein the buffer layer is between about 70 and 93 atomic percent cobalt, between about 5 and 25 atomic percent chromium, and between about 2 and 10 atomic percent tantalum.

8. The structure described in claim 6 wherein the seed layer has a thickness between about 20 and 150 Angstroms.

9. The structure described in claim 6 wherein the magnetically hard layer has a thickness between about 100 and 600 Angstroms.

10. The structure described in claim 6 wherein the magnetically hard layer is between about 50 and 93 atomic percent cobalt, between about 5 and 25 atomic percent chromium, and between about 2 and 10 atomic percent platinum.

11. The structure described in claim 6 wherein the seed layer is between about 80 and 95 atomic percent chromium and between about 5 and 20 atomic percent titanium.

12. A process for forming a longitudinal bias structure for use in a GMR based magnetic read head, comprising:
    on a substrate, depositing, to a thickness between about 20 and 150 Angstroms, a seed layer that comprises chromium;
    on the seed layer, depositing a buffer layer that is between about 70 and 93 atomic percent cobalt, between about 5 and 25 atomic percent chromium, and between about 2 and 10 atomic percent tantalum to a thickness between about 10 and 100 Angstroms; and
    on the buffer layer, depositing, to a thickness between about 100 and 600 Angstroms, a magnetically hard layer that is between about 50 and 93 atomic percent cobalt, between about 5 and 25 atomic percent chromium, and between about 2 and 50 atomic percent platinum.

13. The process described in claim 12 further comprising depositing a layer of tantalum, between about 10 and 100 Angstroms thick, between the substrate and the seed layer.

14. The process described in claim 12 wherein the seed layer further comprises between about 80 and 95 atomic percent chromium and between about 5 and 20 atomic percent titanium.

15. A process for forming a longitudinal bias structure for use in a GMR based magnetic read head, comprising:
    on a substrate, depositing, to a thickness between about 20 and 150 Angstroms, a seed layer that comprises chromium;

on the seed layer, depositing a buffer layer that is between about 70 and 93 atomic percent cobalt, between about 5 and 25 atomic percent chromium, and between about 2 and 10 atomic percent tantalum to a thickness between about 10 and 100 Angstroms; and on the buffer layer, depositing, to a thickness between about 100 and 600 Angstroms, a magnetically hard layer that is between about 50 and 95 atomic percent cobalt and between about 5 and 50 atomic percent platinum.

16. The process described in claim 15 further comprising depositing a layer of tantalum, between about 10 and 100 Angstroms thick, between the substrate and the seed layer.

17. The process described in claim 15 wherein the seed layer further comprises between about 80 and 95 atomic percent chromium and between about 5 and 20 atomic percent titanium.

* * * * *